(12) United States Patent
Zeng et al.

(10) Patent No.: US 12,223,146 B2
(45) Date of Patent: Feb. 11, 2025

(54) DISPLAY PANEL AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Yang Zeng, Beijing (CN); Tianci Chen, Beijing (CN); Shun Zhang, Beijing (CN); Chang Luo, Beijing (CN); Yuanqi Zhang, Beijing (CN); Yi Zhang, Beijing (CN); Youngyik Ko, Beijing (CN); Sanghun Kang, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/041,073

(22) PCT Filed: Mar. 28, 2022

(86) PCT No.: PCT/CN2022/083339
§ 371 (c)(1),
(2) Date: Feb. 8, 2023

(87) PCT Pub. No.: WO2023/184077
PCT Pub. Date: Oct. 5, 2023

(65) Prior Publication Data
US 2024/0264704 A1    Aug. 8, 2024

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 3/0412* (2013.01); *G06F 2203/04111* (2013.01); *G06F 2203/04112* (2013.01)

(58) Field of Classification Search
None
See application file for complete search history.

(56) References Cited

U.S. PATENT DOCUMENTS

| | | | |
|---|---|---|---|
| 2015/0049260 A1* | 2/2015 | Yashiro | G06F 3/0446 349/12 |
| 2015/0185959 A1* | 7/2015 | Chen | G06F 3/0445 345/175 |

(Continued)

*Primary Examiner* — Dorothy Harris
(74) *Attorney, Agent, or Firm* — Intellectual Valley Law, P.C.

(57) ABSTRACT

A display panel is provided. The display panel includes a touch control structure. The touch control structure includes a plurality of first mesh electrodes and a plurality of second mesh electrodes. A respective one of the plurality of first mesh electrodes includes a plurality of first mesh blocks consecutively electrically connected along a first direction. A respective one of the plurality of second mesh electrodes includes a plurality of second mesh blocks consecutively electrically connected along a second direction. Two adjacent first mesh blocks of the plurality of first mesh blocks are electrically connected to each other through a respective first conductive bridge. The respective first conductive bridge includes a plurality of first single mesh lines spaced apart from each other, and in a layer different from the plurality of first mesh blocks and the plurality of second mesh blocks.

19 Claims, 11 Drawing Sheets

(56) References Cited

U.S. PATENT DOCUMENTS

| | | | |
|---|---|---|---|
| 2017/0052619 A1* | 2/2017 | Park | G06F 3/0446 |
| 2018/0113345 A1* | 4/2018 | Song | G02F 1/134363 |
| 2018/0348912 A1* | 12/2018 | Lee | H10K 50/82 |
| 2019/0204952 A1* | 7/2019 | Han | G06F 3/041662 |
| 2020/0117304 A1* | 4/2020 | Lee | G06F 3/0443 |
| 2022/0155902 A1* | 5/2022 | Chuang | G06F 3/04164 |
| 2022/0269374 A1* | 8/2022 | Lee | G06F 3/04164 |

* cited by examiner

DISPLAY PANEL AND DISPLAY APPARATUS

CROSS-REFERENCE TO RELATED APPLICATION

This application is a national stage application under 35 U.S.C. § 371 of International Application No. PCT/CN2022/083339, filed Mar. 28, 2022, the contents of which are incorporated by reference in the entirety.

TECHNICAL FIELD

The present invention relates to display technology, more particularly, to a display panel and a display apparatus.

BACKGROUND

Various types of touch panels have been developed. Examples of touch panels include one-glass-solution (OGS) touch panels, on-cell touch panels, and in-cell touch panels. The on-cell touch panels provide high touch control accuracy. The on-cell touch panels can be classified into single-layer-on-cell (SLOC) touch panels and multi-layer-on-cell (MLOC) touch panels. In particular, multiple point touch control can be achieved in the MLOC touch panels with superior touch control accuracy and blanking effects.

SUMMARY

In one aspect, the present disclosure provides a display panel, comprising a touch control structure; wherein the touch control structure comprises a plurality of first mesh electrodes and a plurality of second mesh electrodes; wherein a respective one of the plurality of first mesh electrodes comprises a plurality of first mesh blocks consecutively electrically connected along a first direction; a respective one of the plurality of second mesh electrodes comprises a plurality of second mesh blocks consecutively electrically connected along a second direction; two adjacent first mesh blocks of the plurality of first mesh blocks are electrically connected to each other through a respective first conductive bridge; and the respective first conductive bridge comprises a plurality of first single mesh lines spaced apart from each other, and in a layer different from the plurality of first mesh blocks and the plurality of second mesh blocks.

Optionally, a respective first single mesh line of the plurality of first single mesh lines is a unitary structure; and an entirety of the unitary structure crosses over only one second single mesh line of the respective one of the plurality of second mesh electrodes.

Optionally, a total number of the plurality of first single mesh lines is four, each of which is a unitary structure.

Optionally, two adjacent second mesh blocks of the plurality of second mesh blocks are electrically connected to each other through a respective second conductive bridge; and the respective second conductive bridge comprises a plurality of second single mesh lines spaced apart from each other, and in a same layer as the plurality of first mesh blocks and the plurality of second mesh blocks.

Optionally, only portions of the respective one of the plurality of second mesh electrodes that crosses over the respective one of the plurality of first mesh electrodes are the plurality of second single mesh lines; and a respective second single mesh line of the plurality of second single mesh lines crosses over only two single mesh lines of the plurality of first single mesh lines.

Optionally, a total number of the plurality of first single mesh lines is two.

Optionally, an extension direction of at least a segment of a respective first single mesh line of the plurality of first single mesh lines is the same as an extension direction of at least a segment of a respective second single mesh line of the plurality of second single mesh lines.

Optionally, an orthographic projection of the at least a segment of the respective first single mesh line on a base substrate substantially overlaps with an orthographic projection of the at least a segment of the respective second single mesh line on the base substrate.

Optionally, the respective one of the plurality of first mesh electrodes further comprises a plurality of connecting mesh blocks in a same layer as the plurality of first mesh blocks and the plurality of second mesh blocks; and the two adjacent first mesh blocks of the plurality of first mesh blocks are electrically connected to each other through the respective first conductive bridge and a respective connecting mesh block of the plurality of connecting mesh blocks.

Optionally, the respective connecting mesh block is electrically connected to a first adjacent first mesh block of the two adjacent first mesh blocks through at least one first single mesh line of the plurality of first single mesh lines on a first side, and is electrically connected to a second adjacent first mesh block of the two adjacent first mesh blocks through at least one first single mesh line of the plurality of first single mesh lines on a second side.

Optionally, the at least one first single mesh line on the first side is spaced apart from the at least one first single mesh line on the second side by at least three subpixel regions.

Optionally, two adjacent second mesh blocks of the plurality of second mesh blocks and two second single mesh lines connecting the two adjacent second mesh blocks together surround the respective connecting mesh block.

Optionally, the two second single mesh lines surrounding the respective connecting mesh block are spaced apart from each other by five subpixel regions.

Optionally, the respective connecting mesh block has a pattern of mesh lines conforming to patterns of mesh lines of the plurality of first mesh blocks and the plurality of second mesh blocks.

Optionally, the respective connecting mesh block comprises at least three consecutive mesh ring structures and a plurality of branches extending away from the three consecutive mesh ring structures.

Optionally, a respective first single mesh line of the plurality of first single mesh lines is a curved line comprising a first segment and a second segment; and the first segment and the second segment are along sides of no more than two subpixel regions.

Optionally, an orthographic projection of mesh lines of the plurality of first mesh blocks, the plurality of second mesh blocks, a plurality of connecting mesh blocks, the plurality of first single mesh lines, and a plurality of second single mesh lines on a base substrate has an approximate repeating pattern.

Optionally, a minimum repeating unit of the approximate repeating pattern encompasses four subpixel regions in a same pixel region.

Optionally, a minimum repeating unit of the approximate repeating pattern has a hexagonal shape; the hexagonal shape comprises three consecutive ring structures; the hexagonal shape comprises two sides extending along the second direction, two sides extending along a third direction, and two sides extending along a fourth direction; each of the two sides extending along the second direction is along only one side of a subpixel region; each of the two sides extending along the third direction are along two sides respectively from two subpixel regions; and each of the two sides extending along the fourth direction are along two sides respectively from two subpixel regions.

In another aspect, the present disclosure provides a display apparatus, comprising the display panel described herein or fabricated by a method described herein, and one or more integrated circuits connected to the display panel.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a display panel and a display apparatus that substantially obviate one or more of the problems due to limitations and disadvantages of the related art. In one aspect, the present disclosure provides a display panel comprising a touch control structure. In some embodiments, the touch control structure includes a plurality of first mesh electrodes and a plurality of second mesh electrodes. Optionally, a respective one of the plurality of first mesh electrodes comprises a plurality of first mesh blocks consecutively electrically connected along a first direction. Optionally, a respective one of the plurality of second mesh electrodes comprises a plurality of second mesh blocks consecutively electrically connected along a second direction. Optionally, two adjacent first mesh blocks of the plurality of first mesh blocks are electrically connected to each other through a respective first conductive bridge. Optionally, the respective first conductive bridge comprises a plurality of first single mesh lines spaced apart from each other, and in a layer different from the plurality of first mesh blocks and the plurality of second mesh blocks.

Figure 1:
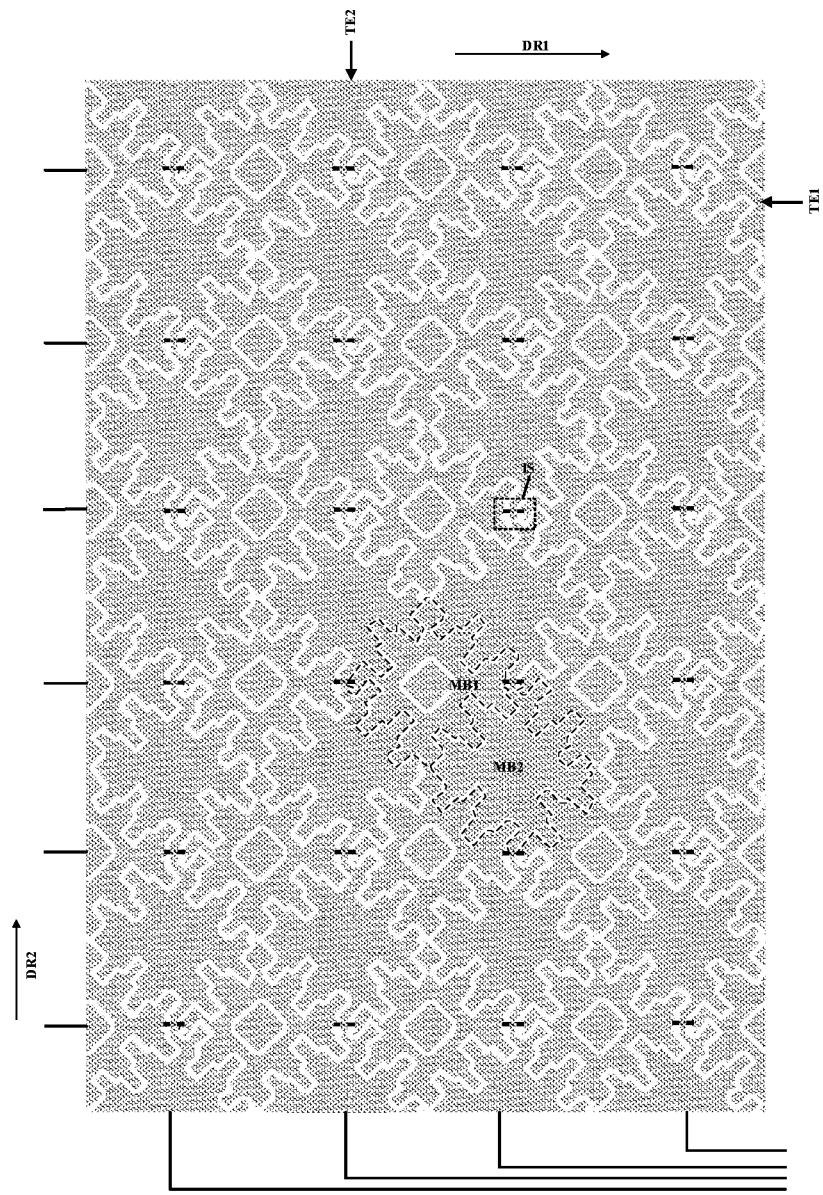
FIG. 1 is a schematic diagram illustrating the structure of a display panel in some embodiments according to the present disclosure.

FIG. 1 is a schematic diagram illustrating the structure of a display panel in some embodiments according to the present disclosure. Referring to FIG. 1, the touch control structure in some embodiments includes a plurality of first mesh electrodes TE1 arranged in a plurality of rows and a plurality of second mesh electrodes TE2 arranged in a plurality of columns. The plurality of first mesh electrodes TE1 are arranged in a plurality of rows, each of the plurality of rows is a respective one of the plurality of first mesh electrodes TE1. The plurality of second mesh electrodes TE2 are arranged in a plurality of columns, each of the plurality of columns is a respective one of the plurality of second mesh electrodes TE2. Optionally, the touch control structure is a mutual capacitance type touch control structure. Optionally, the plurality of first mesh electrodes TE1 are a plurality of touch sensing electrodes, and the plurality of second mesh electrodes TE2 are a plurality of touch scanning electrodes. Optionally, the plurality of first mesh electrodes TE1 are a plurality of touch scanning electrodes, and the plurality of second mesh electrodes TE2 are a plurality of touch sensing electrodes.

As shown in FIG. 1, a respective one of the plurality of first mesh electrodes TE1 includes a plurality of first mesh blocks MB1 consecutively electrically connected in a respective row along a first direction DR1, a respective one of the plurality of second mesh electrodes TE2 includes a plurality of second mesh blocks MB2 consecutively electrically connected in a respective column along a second direction DR2. In FIG. 1, a respective one of the plurality of first mesh blocks MB1 and a respective one of the plurality of second mesh blocks MB2 are depicted as blocks respectively encircled by dotted lines.

Figure 2A:
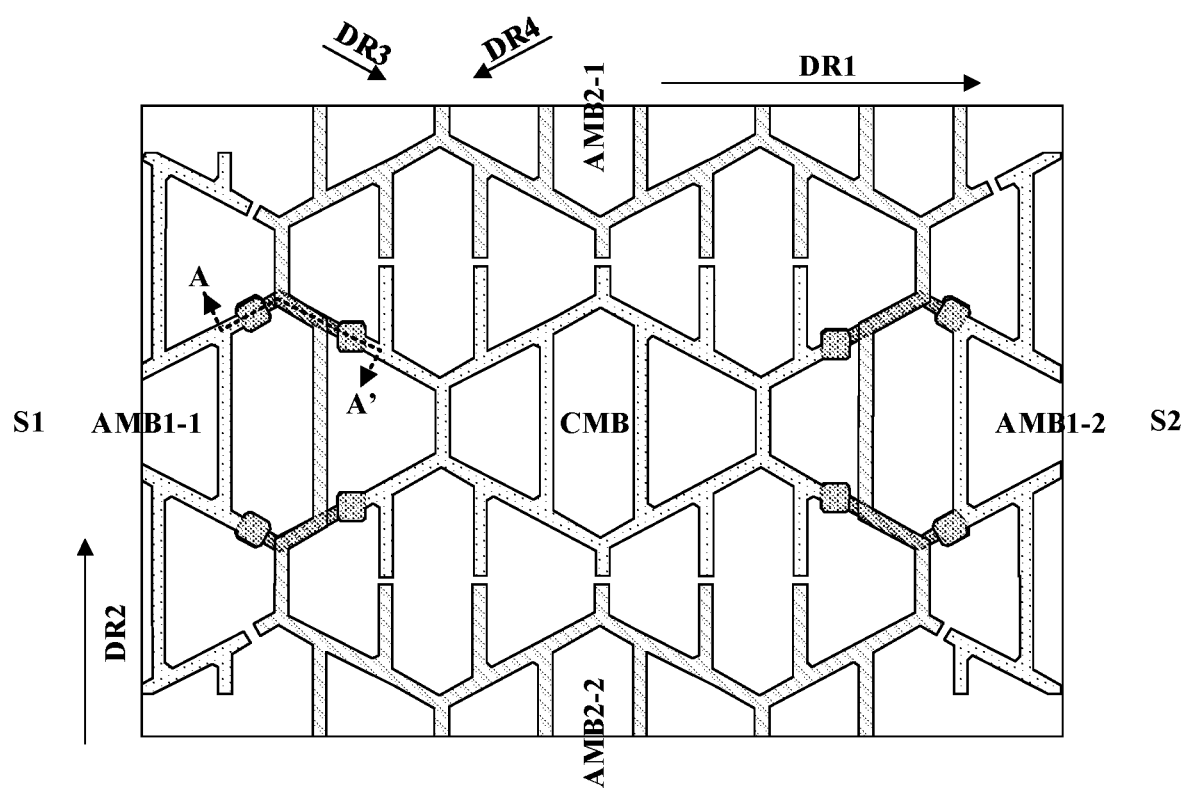
FIG. 2A illustrates the structure of an intersection IS in FIG. 1.
Figure 2B:
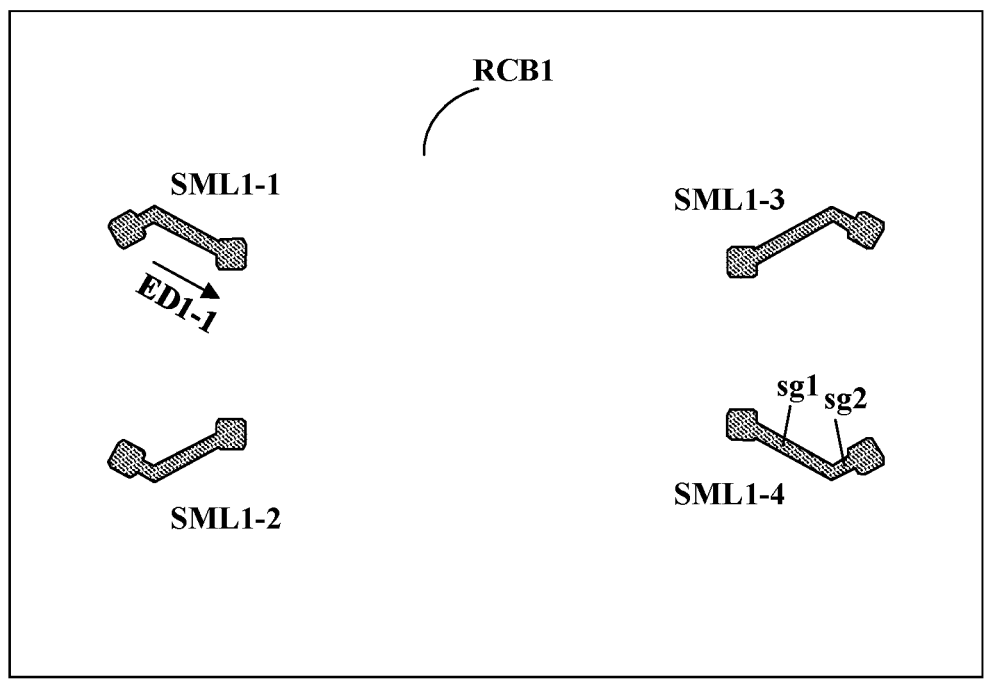
FIG. 2B illustrates the structure of a first mesh line layer in FIG. 2A.
Figure 2C:
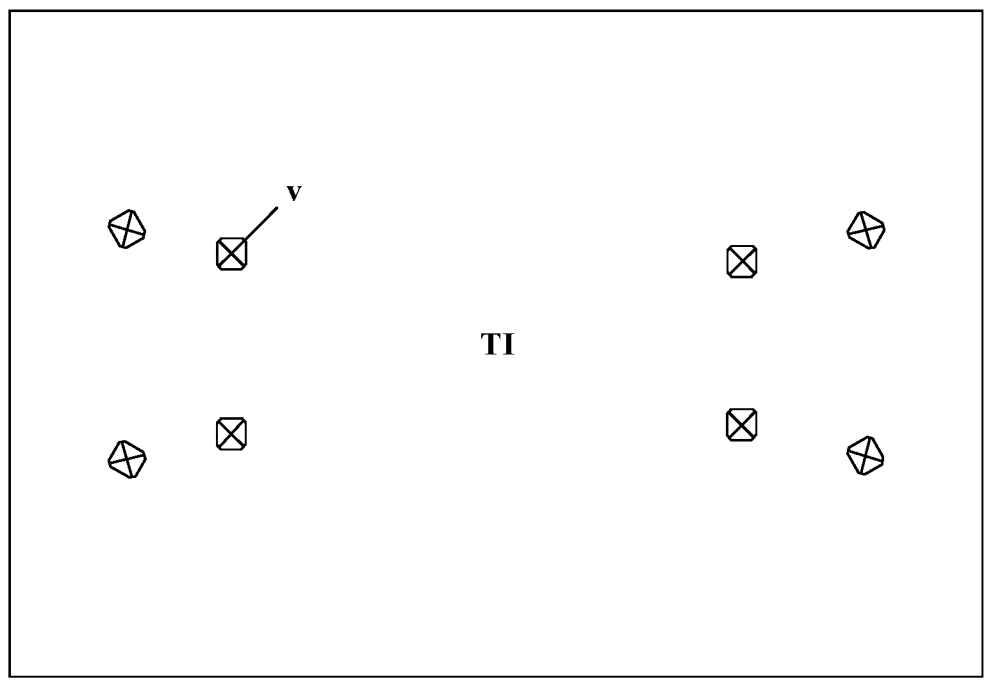
FIG. 2C illustrates the structure of a touch insulating layer in FIG. 2A.
Figure 2D:
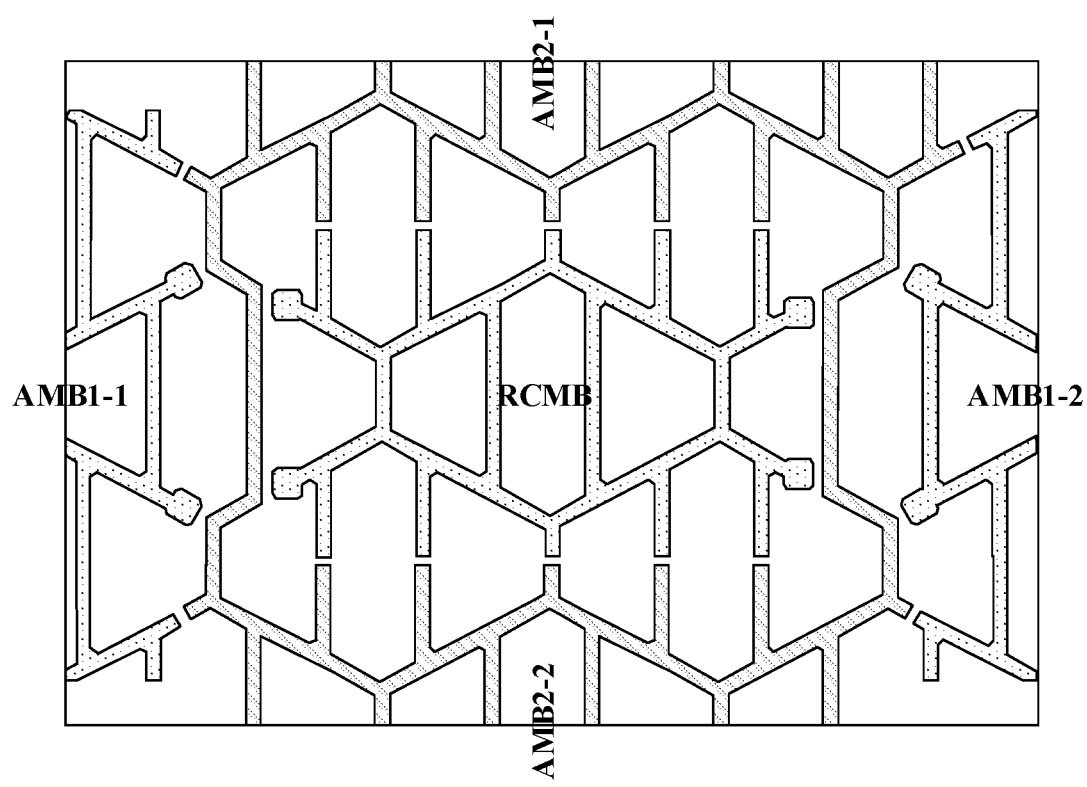
FIG. 2D illustrates the structure of a second mesh line layer in FIG. 2A.

FIG. 2A illustrates the structure of an intersection IS in FIG. 1. FIG. 2B illustrates the structure of a first mesh line layer in FIG. 2A. FIG. 2C illustrates the structure of a touch insulating layer in FIG. 2A. FIG. 2D illustrates the structure of a second mesh line layer in FIG. 2A. FIG. 2A shows an intersection IS in FIG. 1 where two adjacent first mesh blocks of the plurality of first mesh blocks MB1 of a respective one of the plurality of first mesh electrodes TE1 electrically connect to each other, and where two adjacent second mesh blocks of the plurality of second mesh blocks MB2 of a respective one of the plurality of second mesh electrodes TE2 electrically connect to each other.

In some embodiments, two adjacent first mesh blocks of the plurality of first mesh blocks are electrically connected to each other through a respective first conductive bridge. FIG. 2B shows the structure of a respective first conductive bridge RCB1 in some embodiments according to the present disclosure. The respective first conductive bridge RCB1 includes a plurality of first single mesh lines spaced apart from each other, and in a layer different from the plurality of first mesh blocks and the plurality of second mesh blocks. Referring to FIG. 2B, in one example, the respective first conductive bridge RCB1 includes a first-first single mesh line SML1-1, a second-first single mesh line SML1-2, a third-first single mesh line SML1-3, and a fourth-first single mesh line SML1-4. The plurality of first single mesh lines are in the first mesh line layer, and the plurality of first mesh blocks and the plurality of second mesh blocks are in the second mesh line layer. As used herein, the term "single mesh line" refers to a mesh line having a unitary structure and lacking any ring structure.

FIG. 2C shows a plurality of vias v extending through the touch insulating layer TI. The second mesh line layer is connected to the plurality of single mesh lines through the plurality of vias v, respectively.

Referring to FIG. 2D, in the intersection, the second mesh line layer includes two adjacent first mesh blocks of the plurality of first mesh blocks and two adjacent second mesh blocks of the plurality of second mesh blocks. In one example, the two adjacent first mesh blocks includes a first adjacent first mesh block AMB1-1 and a second adjacent first mesh block AMB1-2; and the two adjacent second mesh blocks includes a first adjacent second mesh block AMB2-1 and a second adjacent second mesh block AMB2-2.

Referring to FIG. 2A to FIG. 2D, in the intersection, only portions of the respective one of the plurality of first mesh electrodes TE1 that crosses over the respective one of the plurality of second mesh electrodes TE2 are the plurality of first single mesh lines. A respective first single mesh line of the plurality of first single mesh lines crosses over only a second single mesh line of the respective one of the plurality of second mesh electrodes.

As discussed above, a respective first single mesh line of the plurality of first single mesh lines is a unitary structure. Referring to FIG. 2A to FIG. 2D, the unitary structure of the respective first single mesh line crosses over mesh lines of the respective one of the plurality of second mesh electrodes only once. In one example, an entirety of the unitary structure crosses over only one second single mesh line of the respective one of the plurality of second mesh electrodes, as shown in FIG. 2A to FIG. 2D.

In related touch control structures, conductive bridges connecting adjacent touch electrodes typically raise several issues, one of which is the black spots caused by the presence of the conductive bridges. The conductive bridges are in a different layer from the touch electrodes, this in itself results in different visual effects between the two layers. Because they are in different layers, there is a segmental difference where a conductive bridge connects to the adjacent touch electrodes. The conductive material of the adjacent touch electrodes connects to the conductive bridge through a slope, further contributing to the occurrence of visually detectable black spots. The inventors of the present disclosure discover that the intricate structure of mesh lines in the intersection of the present disclosure effectively obviates the several issues associated with the related art.

Figure 2E:
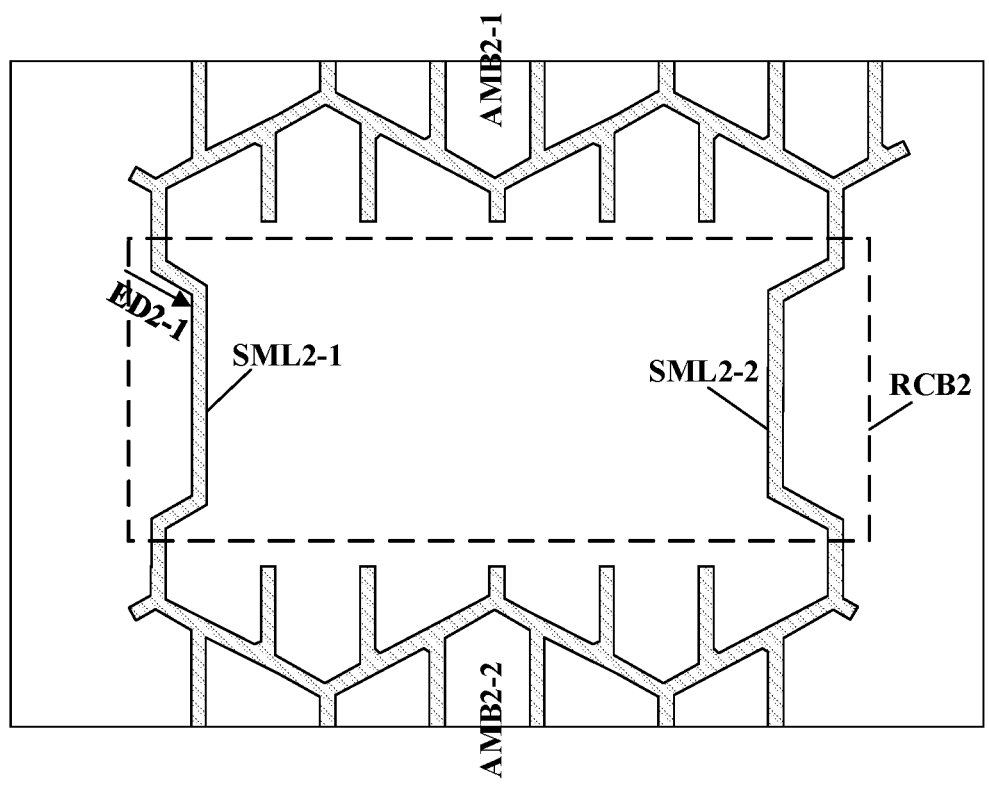
FIG. 2E illustrates the structure of a respective second conductive bridge and two adjacent second mesh blocks in FIG. 2A.

FIG. 2E illustrates the structure of a respective second conductive bridge and two adjacent second mesh blocks in FIG. 2A. In some embodiments, the respective second conductive bridge and two adjacent second mesh blocks are all in the second mesh line layer. Referring to FIG. 2E, two adjacent second mesh blocks (AMB2-1 and AMB2-2) of the plurality of second mesh blocks are electrically connected to each other through a respective second conductive bridge RCB2. The respective second conductive bridge RCB2 includes a plurality of second single mesh lines spaced apart from each other, and in a same layer as the plurality of first mesh blocks and the plurality of second mesh blocks. In one example, the respective second conductive bridge RCB2 includes a first-second single mesh line SML2-1 and a second-second single mesh line SML2-2. The first-second single mesh line SML2-1, the second-second single mesh line SML2-2, the first adjacent second mesh block AMB2-1, and the second adjacent second mesh block AMB2-2 form a ring structure. The first-second single mesh line SML2-1, the second-second single mesh line SML2-2, the first adjacent second mesh block AMB2-1, and the second adjacent second mesh block AMB2-2 are parts of a unitary structure.

Referring to FIG. 2A to FIG. 2E, the unitary structure of an individual first single mesh line crosses over only one second single mesh line. In one example, the entire unitary structure of the first-first single mesh line SML1-1 crosses over only the first-second single mesh line SML2-1; the entire unitary structure of the second-first single mesh line SML1-2 crosses over only the first-second single mesh line SML2-1; the entire unitary structure of the third-first single mesh line SML1-3 crosses over only the second-second single mesh line SML2-2; and the entire unitary structure of the fourth-first single mesh line SML1-4 crosses over only the second-second single mesh line SML2-2. The present touch control structure minimizes a total area of mesh lines in the first mesh line layer, and minimizes a total number and area of slopes where mesh blocks in the second mesh line layer connect to the conductive bridges in the first mesh line layer. The inventors of the present disclosure discover that the intricate structure of mesh lines in the intersection of the present disclosure effectively obviates the several issues associated with the related art, while maintaining excellent touch function.

In some embodiments, only portions of the respective one of the plurality of second mesh electrodes that crosses over the respective one of the plurality of first mesh electrodes are the plurality of second single mesh lines. In one example, the only portions of the respective one of the plurality of second mesh electrodes that crosses over the respective one of the plurality of first mesh electrodes are the first-second single mesh line SML2-1 and the second-second single mesh line SML2-2. In one example depicted in FIG. 2A, a respective second single mesh line of the plurality of second single mesh lines crosses over only two single mesh lines of the plurality of first single mesh lines. For example, the first-second single mesh line SML2-1 crosses over only the first-first single mesh line SML1-1 and the second-first single mesh line SML1-2; and the second-second single mesh line SML2-2 crosses over only the third-first single mesh line SML1-3 and the fourth-first single mesh line SML1-4.

In some embodiments, the respective second single mesh line of the plurality of second single mesh lines crosses over two unitary structures from the plurality of first single mesh lines. For example, the first-second single mesh line SML2-1 crosses over two unitary structures of the first-first single mesh line SML1-1 and the second-first single mesh line SML1-2; and the second-second single mesh line SML2-2 crosses over two unitary structures of third-first single mesh line SML1-3 and the fourth-first single mesh line SML1-4.

In some embodiments, an extension direction of at least a segment of a respective first single mesh line of the plurality of first single mesh lines is the same as an extension direction of at least a segment of a respective second single mesh line of the plurality of second single mesh lines. Referring to FIG. 2B, an extension direction ED1-1 of at least a segment of the first-first single mesh line SML1-1 is the same as an extension direction ED2-1 of at least a segment of the first-second single mesh line SML2-1.

Figure 2F:
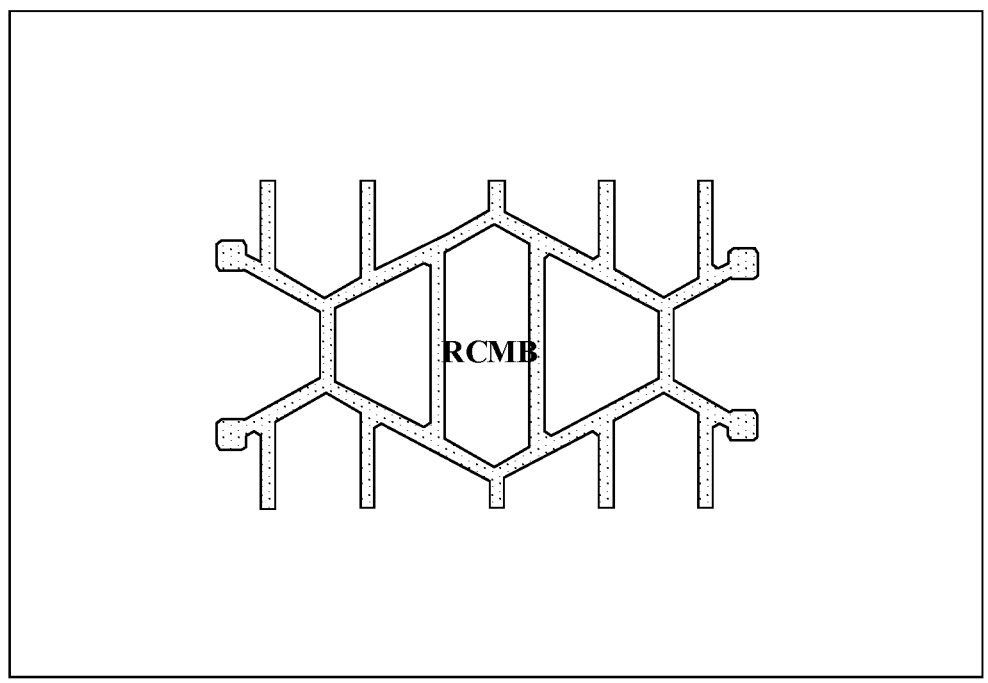
FIG. 2F illustrates the structure of a respective connecting mesh block in FIG. 2A.

In some embodiments, referring to FIG. 2A to FIG. 2E, the respective one of the plurality of first mesh electrodes further includes a plurality of connecting mesh blocks in a same layer as the plurality of first mesh blocks and the plurality of second mesh blocks. FIG. 2F illustrates the structure of a respective connecting mesh block in FIG. 2A. The two adjacent first mesh blocks of the plurality of first mesh blocks (e.g., the first adjacent first mesh block AMB1-1 and the second adjacent first mesh block AMB1-2) are electrically connected to each other through the respective first conductive bridge RCB1 and a respective connecting mesh block RCMB of the plurality of connecting mesh blocks.

In some embodiments, referring to FIG. 2A to FIG. 2F, two adjacent second mesh blocks of the plurality of second mesh blocks and two second single mesh lines connecting the two adjacent second mesh blocks together surround the respective connecting mesh block RCMB. For example, the first-second single mesh line SML2-1, the second-second single mesh line SML2-2, the first adjacent second mesh block AMB2-1, and the second adjacent second mesh block AMB2-2 together surround the respective connecting mesh block RCMB.

Figure 3:
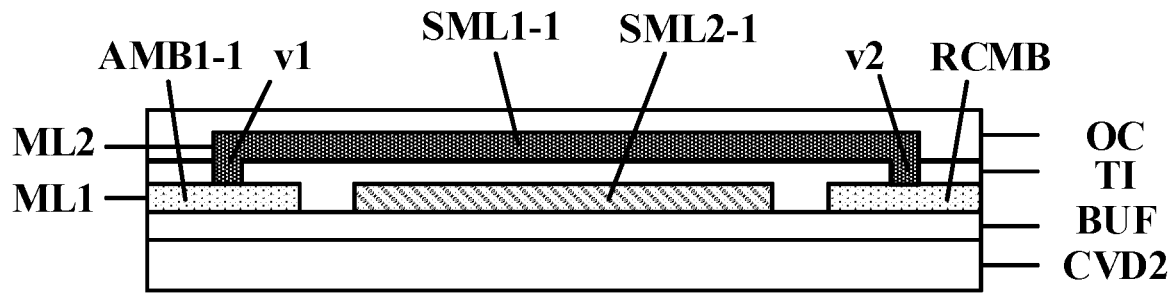
FIG. 3 is a cross-sectional view along an A-A' line in FIG. 2A.

FIG. 3 is a cross-sectional view along an A-A' line in FIG. 2A. Referring to FIG. 3, the display panel in some embodiments further includes a second inorganic encapsulating sub-layer CVD2, a buffer layer BUF on the second inorganic encapsulating sub-layer CVD2, a first mesh line layer ML1 on a side of the buffer layer BUF away from the second inorganic encapsulating sub-layer CVD2, a touch insulating layer TI on a side of the first mesh line layer ML1 away from the buffer layer BUF, a second mesh line layer ML2 on a side of the touch insulating layer TI away from the first mesh line layer ML1, and an overcoat layer OC on a side of the second mesh line layer ML2 away from the touch insulating layer TI. As shown in FIG. 3, the first-first single mesh line SML1-1 is connected to the first adjacent first mesh block AMB1-1 through a first via v1 extending through the touch insulating layer TI, crosses over the first-second single mesh line SML2-1, and connected to the respective connecting mesh block RCMB through a second via v2 extending through the touch insulating layer TI.

In some embodiments, at least one of the buffer layer BUF, the touch insulating layer TI, or the overcoat layer OC is made of an organic insulating material, enhancing the flexibility of the display panel. In one example, the buffer layer BUF, the touch insulating layer TI, and the overcoat layer OC are made of an organic insulating material.

Similarly, referring to FIG. 2A to FIG. 2E, and FIG. 3, the second-first single mesh line SML1-2 is connected to the first adjacent first mesh block AMB1-1 through a via extending through the touch insulating layer TI, crosses over the first-second single mesh line SML2-1, and connected to the respective connecting mesh block RCMB through a via extending through the touch insulating layer TI. The third-first single mesh line SML1-3 is connected to the second adjacent first mesh block AMB1-2 through a via extending through the touch insulating layer TI, crosses over the second-second single mesh line SML2-2, and connected to the respective connecting mesh block RCMB through a via extending through the touch insulating layer TI. The fourth-first single mesh line SML1-4 is connected to the second adjacent first mesh block AMB1-2 through a via extending through the touch insulating layer TI, crosses over the second-second single mesh line SML2-2, and connected to the respective connecting mesh block RCMB through a via extending through the touch insulating layer TI.

In some embodiments, an orthographic projection of the at least a segment of the respective first single mesh line on a base substrate substantially overlaps with an orthographic projection of the at least a segment of the respective second single mesh line on the base substrate. Referring to FIG. 2A to FIG. 2E, and FIG. 3, an orthographic projection of the at least a segment of the first-first single mesh line SML1-1 on the second inorganic encapsulating sub-layer CVD2 substantially overlaps with an orthographic projection of the at least a segment of the first-second single mesh line SML2-1 on the second inorganic encapsulating sub-layer CVD2. An orthographic projection of the at least a segment of the second-first single mesh line SML1-2 on the second inorganic encapsulating sub-layer CVD2 substantially overlaps with an orthographic projection of the at least a segment of the first-second single mesh line SML2-1 on the second inorganic encapsulating sub-layer CVD2. An orthographic projection of the at least a segment of the third-first single mesh line SML1-3 on the second inorganic encapsulating sub-layer CVD2 substantially overlaps with an orthographic projection of the at least a segment of the second-second single mesh line SML2-2 on the second inorganic encapsulating sub-layer CVD2. An orthographic projection of the at least a segment of the fourth-first single mesh line SML1-4 on the second inorganic encapsulating sub-layer CVD2 substantially overlaps with an orthographic projection of the at least a segment of the second-second single mesh line SML2-2 on the second inorganic encapsulating sub-layer CVD2. As used herein, the term "substantially overlaps" means at least 50% (e.g., at least 60%, at least 70%, at least 80%, at least 90%, at least 95%, at least 99%, or 100%) overlapping.

In some embodiments, an orthographic projection of a respective first single mesh line of the plurality of first single mesh lines on a base substrate is substantially covered by a combination of an orthographic projection of a respective second single mesh line of the plurality of second single mesh lines on a base substrate, an orthographic projection of one of the two adjacent first mesh blocks on a base substrate, and an orthographic projection of the respective connecting mesh block RCMB on a base substrate. As used herein, the term "substantially covers" means covering at least 50% (e.g., at least 60%, at least 70%, at least 80%, at least 90%, at least 95%, at least 99%, or 100%).

In some embodiments, the respective connecting mesh block RCMB is electrically connected to a first adjacent first mesh block AMB1-1 of the two adjacent first mesh blocks through at least one first single mesh line of the plurality of first single mesh lines on a first side, and is electrically connected to a second adjacent first mesh block AMB1-2 of the two adjacent first mesh blocks through at least one first single mesh line of the plurality of first single mesh lines on a second side. For example, the respective connecting mesh block RCMB is electrically connected to a first adjacent first mesh block AMB1-1 through the first-first single mesh line SML1-1 and the second-first single mesh line SML1-2 on a first side S1, respectively; and is electrically connected to a second adjacent first mesh block AMB1-2 through the third-first single mesh line SML1-3 and the fourth-first single mesh line SML1-4 on a second side S2, respectively.

Figure 4:
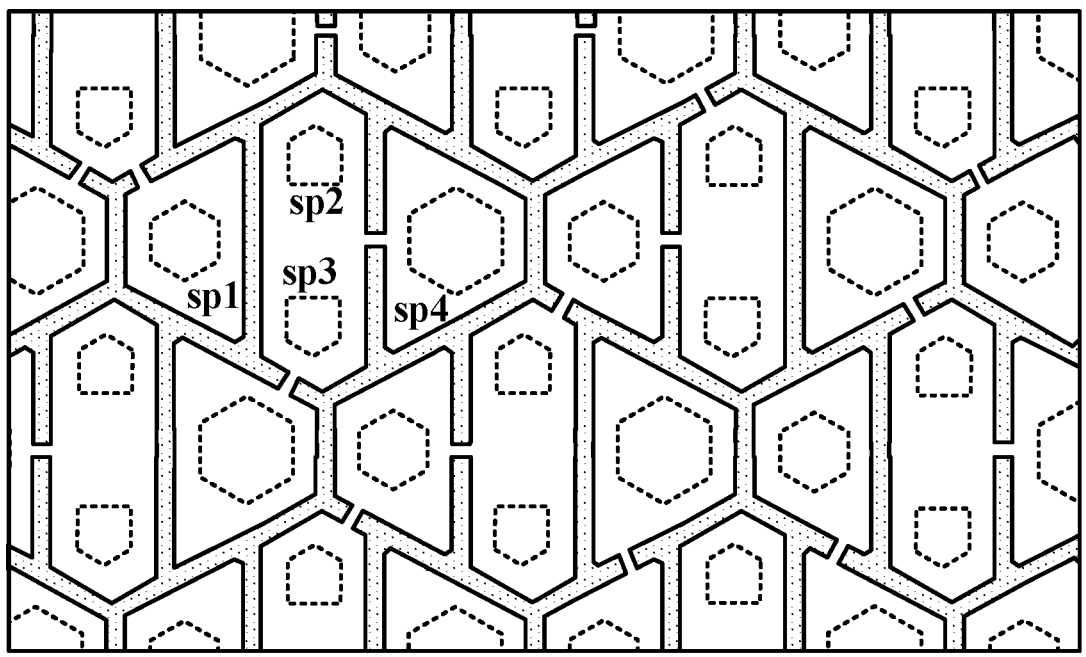
FIG. 4 illustrates an arrangement of a touch control structure relative to a plurality of subpixels in a display panel comprising the touch control structure in some embodiments according to the present disclosure.

FIG. 4 illustrates an arrangement of a touch control structure relative to a plurality of subpixels in a display panel comprising the touch control structure in some embodiments according to the present disclosure. Referring to FIG. 4, in one example, the plurality of subpixels includes a respective first subpixel sp1, a respective second subpixel sp2, a respective third subpixel sp3, and a respective fourth subpixel sp4. Optionally, a respective pixel of the display panel includes the respective first subpixel sp1, the respective second subpixel sp2, the respective third subpixel sp3, and the respective fourth subpixel sp4. The plurality of subpixels in the display panel are arranged in an array. In one example, the array of the plurality of subpixels includes a S1-S2-S3-S4 format repeating array, in which S1 stands for the respective first subpixel sp1, S2 stands for the respective second subpixel sp2, S3 stands for the respective third subpixel sp3, and S4 stands for the respective fourth subpixel sp4. In another example, the S1-S2-S3-S4 format is a C1-C2-C3-C4 format, in which C1 stands for the respective first subpixel sp1 of a first color, C2 stands for the respective second subpixel sp2 of a second color, C3 stands for the respective third subpixel sp3 of a third color, and C4 stands for the respective fourth subpixel sp4 of a fourth color. In another example, the S1-S2-S3-S4 format is a C1-C2-C3-C2' format, in which C1 stands for the respective first subpixel sp1 of a first color, C2 stands for the respective second subpixel sp2 of a second color, C3 stands for the respective third subpixel sp3 of a third color, and C2' stands for the respective fourth subpixel sp4 of the second color. In another example, the C1-C2-C3-C2' format is a R-G-B-G format, in which the respective first subpixel sp1 is a red subpixel, the respective second subpixel sp2 is a green subpixel, the respective third subpixel sp3 is a green subpixel, and the respective fourth subpixel sp4 is a blue subpixel. The dotted lines in FIG. 4 indicate subpixel apertures defined by a pixel definition layer.

Referring to FIG. 4 and FIG. 2A, in some embodiments, the mesh lines of the touch control structure are limited in an inter-subpixel region of the display panel. For example, all mesh lines of the plurality of first mesh blocks, the plurality of second mesh blocks, the plurality of connecting mesh blocks, the plurality of first single mesh lines, and the plurality of second single mesh lines are limited in the inter-subpixel region. Mesh lines of the touch control structure include mesh lines extending along the second direction DR2, mesh lines extending along a third direction DR3, and mesh lines extending along a fourth direction DR4.

In some embodiments, two adjacent mesh lines extending along the second direction DR2 are spaced apart by one subpixel region.

In some embodiments, at least one mesh line of the mesh lines extending along the third direction DR3 are along one side of a first adjacent subpixel region and one side of a second adjacent subpixel region, the first adjacent subpixel region and the second adjacent subpixel region adjacent to each other. In some embodiments, at least one mesh line of the mesh lines extending along the fourth direction DR4 are along one side of a third adjacent subpixel region and one side of a fourth adjacent subpixel region, the third adjacent subpixel region and the fourth adjacent subpixel region adjacent to each other.

Figure 5:
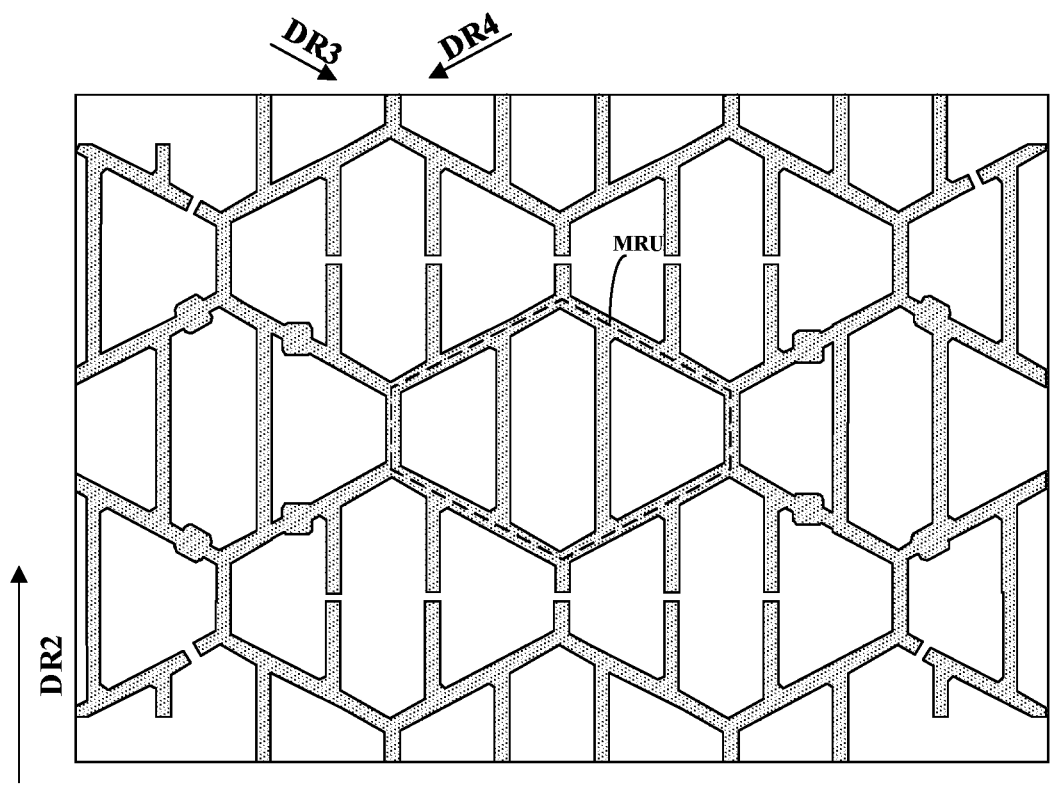
FIG. 5 shows an orthographic projection of mesh lines of the touch control structure on a base substrate in some embodiments according to the present disclosure.

FIG. 5 shows an orthographic projection of mesh lines of the touch control structure on a base substrate in some embodiments according to the present disclosure. The orthographic projection depicted in FIG. 5 is an orthographic projection of mesh lines including mesh lines of the plurality of first mesh blocks, the plurality of second mesh blocks, the plurality of connecting mesh blocks, the plurality of first single mesh lines, and the plurality of second single mesh lines. Referring to FIG. 5, in some embodiments, the orthographic projection of the mesh lines of the touch control structure has an approximate repeating pattern. A minimum repeating unit MRU of the approximate repeating pattern is denoted in FIG. 5. As used herein, the term approximate repeating pattern refers to that any two approximate repeating units superimpose each other by at least 85%, e.g., at least 90%, at least 95%, at least 98%, or at least 99%, upon a translation operation on one approximate repeating unit to superimpose the other approximate repeating unit. For example, two approximate repeating units, upon the translation operation, do not superimpose each other where one approximate repeating unit has a break in the mesh line.

Referring to FIG. 4 and FIG. 5, in some embodiments, the minimum repeating unit MRU encompasses four subpixel regions. In one example, the minimum repeating unit MRU encompasses four subpixel regions belonging to a same pixel. In one example, the minimum repeating unit MRU has a hexagonal shape. In another example, the minimum repeating unit MRU includes three consecutive ring structures. As used herein, the term ring encompasses a closed ring and an open ring. The hexagonal shape has two sides extending along the second direction DR2, two sides extending along the third direction DR3, and two sides extending along the fourth direction DR4. Each of the two sides extending along the second direction DR2 is along only one side of a subpixel region. Each of the two sides extending along the third direction DR3 are along two sides respectively from two subpixel regions. Each of the two sides extending along the fourth direction DR4 are along two sides respectively from two subpixel regions.

Referring to FIG. 2A to FIG. 2E, and FIG. 4 again, in some embodiments, at least one first single mesh line on the first side S1 is spaced apart from at least one first single mesh line on the second side S2 by at least three subpixel regions. For example, the first-first single mesh line SML1-1 is spaced apart from the third-first single mesh line SML1-3 by at least three subpixel regions, e.g., 3, 4, or 5 subpixel regions. In another example, the second-first single mesh line SML1-2 is spaced apart from the fourth-first single mesh line SML1-4 by at least three subpixel regions, e.g., 3, 4, or 5 subpixel regions. By sufficiently spacing apart the first single mesh lines of the first conductive bridge, the black spot issue in related art may be further reduced or eliminated. The inventors of the present disclosure discover that the intricate structure of mesh lines in the intersection of the present disclosure effectively obviates the several issues associated with the related art, while maintaining excellent touch function.

In some embodiments, the two second single mesh lines surrounding the respective connecting mesh block are spaced apart from each other by five subpixel regions. For example, the first-second single mesh line SML2-1 and the second-second single mesh line SML2-2 are spaced apart from each other by five subpixel regions. By sufficiently spacing apart the second single mesh lines of the second conductive bridge, the black spot issue in related art may be further reduced or eliminated. The inventors of the present disclosure discover that the intricate structure of mesh lines in the intersection of the present disclosure effectively obviates the several issues associated with the related art, while maintaining excellent touch function.

In some embodiments, the respective connecting mesh block RCMB has a pattern of mesh lines conforming to patterns of mesh lines of the plurality of first mesh blocks and the plurality of second mesh blocks. As used herein, the term conforming means that a combination of the plurality of connecting mesh blocks, the plurality of first mesh blocks, and the plurality of second mesh blocks has an approximate repeating pattern so that any two approximate repeating units of the approximate repeating pattern superimpose each other by at least 85%, e.g., at least 90%, at least 95%, at least 98%, or at least 99%, upon a translation operation on one approximate repeating unit to superimpose the other approximate repeating unit.

Referring to FIG. 2F, in one example, the respective connecting mesh block RCMB includes at least three consecutive mesh ring structures and a plurality of branches extending away from the three consecutive mesh ring structures.

Referring to FIG. 2B, in one example, a respective first single mesh line of the plurality of first single mesh lines is a curved line comprising a first segment sg1 and a second segment sg2. Referring to FIG. 2A to FIG. 2E, and FIG. 4, the first segment sg1 and the second segment sg2 are along sides of no more than two subpixel regions.

In another aspect, the present disclosure provides a display apparatus including the display panel described herein or fabricated by a method described herein, and one or more integrated circuits connected to the display panel. Examples of appropriate display apparatuses include, but are not limited to, an electronic paper, a mobile phone, a tablet computer, a television, a monitor, a notebook computer, a digital album, a GPS, etc. Optionally, the display apparatus is an organic light emitting diode display apparatus. Optionally, the display apparatus is a liquid crystal display apparatus.

Figure 6A:
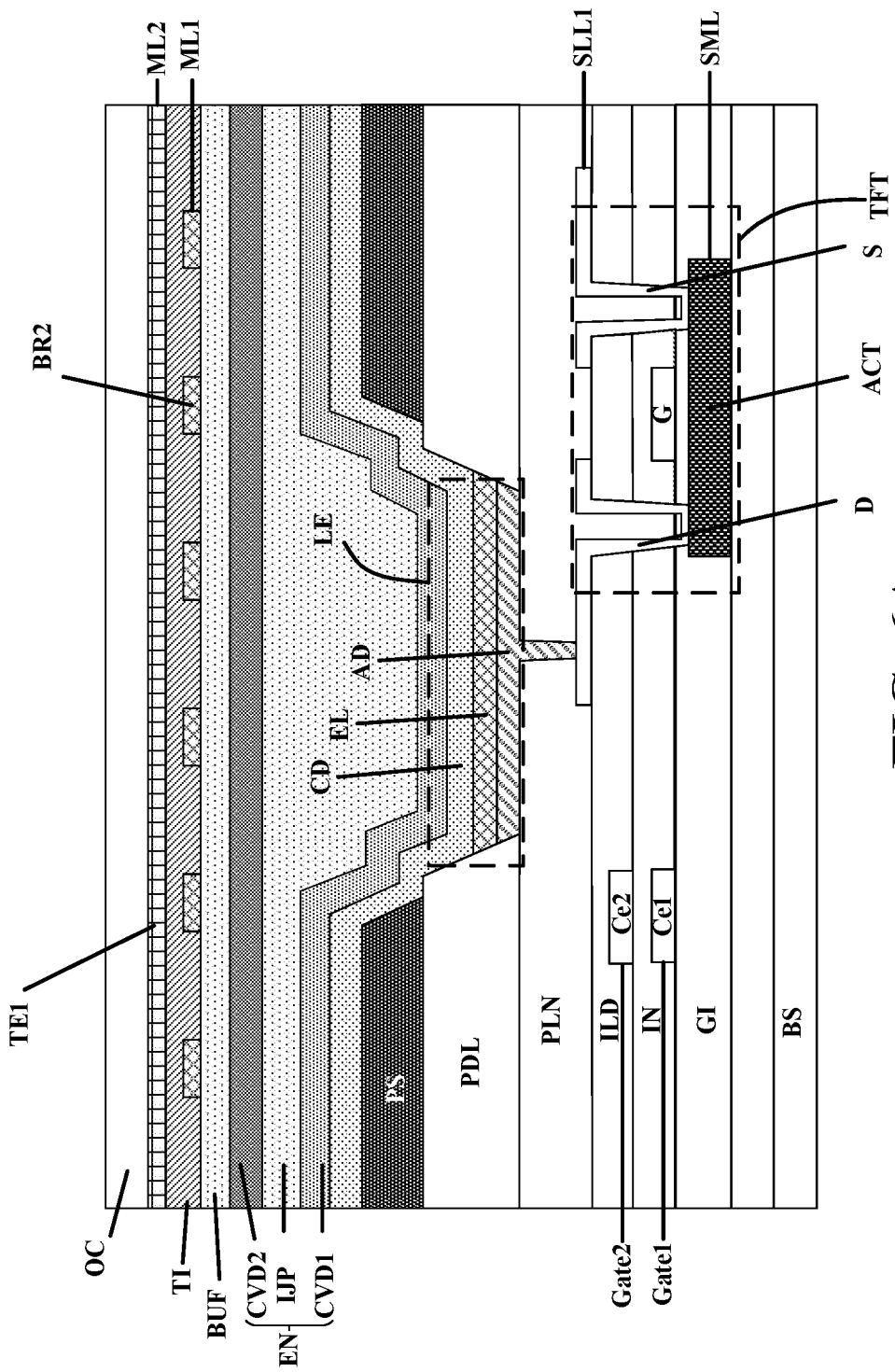
FIG. 6A illustrates a detailed structure in a display area in a display apparatus in some embodiments according to the present disclosure.

FIG. 6A illustrates a detailed structure in a display area in a display apparatus in some embodiments according to the present disclosure. Referring to FIG. 6A, the display apparatus in the display area in some embodiments includes a base substrate BS (e.g., a flexible base substrate); an active layer ACT of a respective one of a plurality of thin film transistors TFT on the base substrate BS; a gate insulating layer GI on a side of the active layer ACT away from the base substrate BS; a gate electrode G and a first capacitor electrode Ce1 (both are parts of a first gate metal layer) on a side of the gate insulating layer GI away from the base substrate BS; an insulating layer IN on a side of the gate electrode G and the first capacitor electrode Ce1 away from the gate insulating layer GI; a second capacitor electrode Ce2 (a part of a second gate metal layer) on a side of the insulating layer IN away from the gate insulating layer GI; an inter-layer dielectric layer ILD on a side of the second capacitor electrode Ce2 away from the gate insulating layer GI; a source electrode S and a drain electrode D (parts of a first SD metal layer) on a side of the inter-layer dielectric layer ILD away from the gate insulating layer GI; a planarization layer PLN on a side of the source electrode S and the drain electrode D away from the inter-layer dielectric layer ILD; a pixel definition layer PDL defining a subpixel aperture and on a side of the planarization layer PLN away from the base substrate BS; and a light emitting element LE in the subpixel aperture. The light emitting element LE includes an anode AD on a side of the planarization layer PLN away from the inter-layer dielectric layer ILD; a light emitting layer EL on a side of the anode AD away from the planarization layer PLN; and a cathode layer CD on a side of the light emitting layer EL away from the anode AD. The display apparatus in the display area further includes an encapsulating layer EN encapsulating the dummy light emitting element DLE, and on a side of the cathode layer CD away from the base substrate BS. The encapsulating layer EN in some embodiments includes a first inorganic encapsulating sub-layer CVD1 on a side of the cathode layer CD away from the base substrate BS, an organic encapsulating sub-layer IJP on a side of the first inorganic encapsulating sub-layer CVD1 away from the base substrate BS, and a second inorganic encapsulating sub-layer CVD2 on a side of the organic encapsulating sub-layer IJP away from the first inorganic encapsulating sub-layer CVD1. The display apparatus in the display area further includes a buffer layer BUF on a side of the encapsulating layer EN away from the base substrate BS; a plurality of second electrode bridges BR2 on a side of the buffer layer BUF away from the encapsulating layer EN; a touch insulating layer TI on a side of the plurality of second electrode bridges BR2 away from the buffer layer BUF; a plurality of first touch electrodes TE1 on a side of the touch insulating layer TI away from the buffer layer BUF; and an overcoat layer OC on a side of the plurality of first touch electrodes TE1 away from the touch insulating layer TI.

Figure 6B:
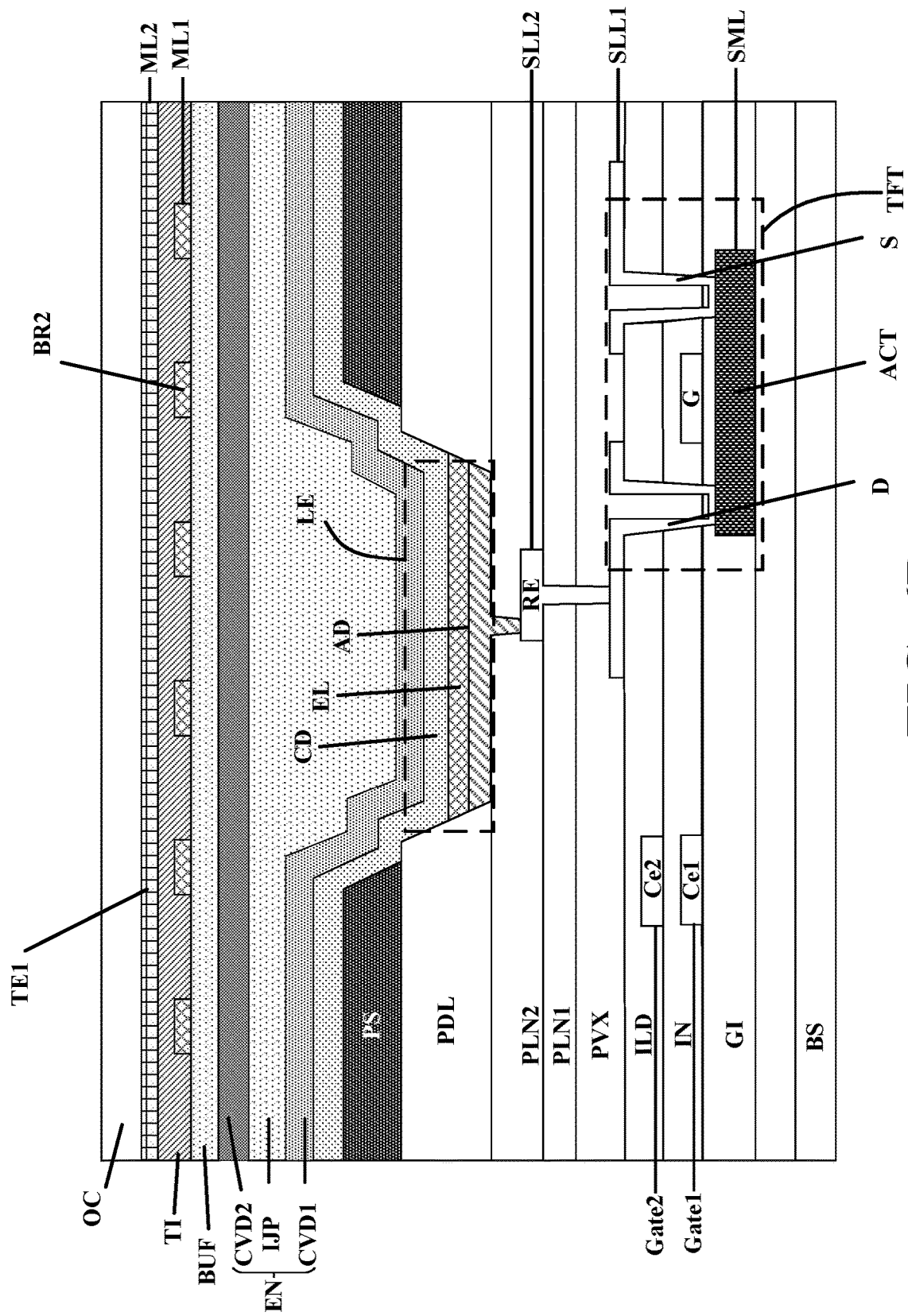
FIG. 6B illustrates a detailed structure in a display area in a display apparatus in some embodiments according to the present disclosure.

FIG. 6B illustrates a detailed structure in a display area in a display apparatus in some embodiments according to the present disclosure. Referring to FIG. 6B, the display apparatus in the display area in some embodiments includes a base substrate BS (e.g., a flexible base substrate); an active layer ACT of a respective one of a plurality of thin film transistors TFT on the base substrate BS; a gate insulating layer GI on a side of the active layer ACT away from the base substrate BS; a gate electrode G and a first capacitor electrode Ce1 (both are parts of a first gate metal layer) on a side of the gate insulating layer GI away from the base substrate BS; an insulating layer IN on a side of the gate electrode G and the first capacitor electrode Ce1 away from the gate insulating layer GI; a second capacitor electrode Ce2 (a part of a second gate metal layer) on a side of the insulating layer IN away from the gate insulating layer GI; an inter-layer dielectric layer ILD on a side of the second capacitor electrode Ce2 away from the gate insulating layer GI; a source electrode S and a drain electrode D (parts of a first SD metal layer) on a side of the inter-layer dielectric layer ILD away from the gate insulating layer GI; a passivation layer PVX on a side of the source electrode S and the drain electrode D away from the inter-layer dielectric layer ILD; a first planarization layer PLN1 on a side of the passivation layer PVX away from the inter-layer dielectric layer ILD; a relay electrode RE (part of a second SD metal layer) on side of the first planarization layer PLN1 away from the passivation layer PVX; a second planarization layer PLN2 on a side of the relay electrode RE away from the first planarization layer PLN1; a pixel definition layer PDL defining a subpixel aperture and on a side of the second planarization layer PLN2 away from the base substrate BS; and a light emitting element LE in the subpixel aperture. The light emitting element LE includes an anode AD on a side of the second planarization layer PLN2 away from the first planarization layer PLN1; a light emitting layer EL on a side of the anode AD away from the second planarization layer PLN2; and a cathode layer CD on a side of the light emitting layer EL away from the anode AD. The display apparatus in the display area further includes an encapsulating layer EN encapsulating the dummy light emitting element DLE, and on a side of the cathode layer CD away from the base substrate BS. The encapsulating layer EN in some embodiments includes a first inorganic encapsulating sub-layer CVD1 on a side of the cathode layer CD away from the base substrate BS, an organic encapsulating sub-layer IJP on a side of the first inorganic encapsulating sub-layer CVD1 away from the base substrate BS, and a second inorganic encapsulating sub-layer CVD2 on a side of the organic encapsulating sub-layer IJP away from the first inorganic encapsulating sub-layer CVD1. The display apparatus in the display area further includes a buffer layer BUF on a side of the encapsulating layer EN away from the base substrate BS; a plurality of second electrode bridges BR2 on a side of the buffer layer BUF away from the encapsulating layer EN; a touch insulating layer TI on a side of the plurality of second electrode bridges BR2 away from the buffer layer BUF; a plurality of first touch electrodes TE1 on a side of the touch insulating layer TI away from the buffer layer BUF; and an overcoat layer OC on a side of the plurality of first touch electrodes TE1 away from the touch insulating layer TI. Optionally, the display apparatus in the display area does not include the passivation layer PVX, e.g., the inter-layer dielectric layer ILD is in direct contact with the first planarization layer PLN1.

Referring to FIG. 6A and FIG. 6B, the display apparatus includes a semiconductor material layer SML, a first gate metal layer Gate1, a second gate metal layer Gate2, a first signal line layer SLL1, and a second signal line layer SLL2. The display apparatus further includes an insulating layer IN between the first gate metal layer Gate1 and the second gate metal layer Gate2; an inter-layer dielectric layer ILD between the second gate metal layer Gate2 and the first signal line layer SLL1; and at least a passivation layer PVX or a planarization layer PLN between the first signal line layer SLL1 and the second signal line layer SLL2.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display panel, comprising a touch control structure; wherein the touch control structure comprises a plurality of first mesh electrodes and a plurality of second mesh electrodes;

wherein a respective one of the plurality of first mesh electrodes comprises a plurality of first mesh blocks consecutively electrically connected along a first direction;

a respective one of the plurality of second mesh electrodes comprises a plurality of second mesh blocks consecutively electrically connected along a second direction;

two adjacent first mesh blocks of the plurality of first mesh blocks are electrically connected to each other through a respective first conductive bridge; and the respective first conductive bridge comprises a plurality of first single mesh lines spaced apart from each other, and in a layer different from the plurality of first mesh blocks and the plurality of second mesh blocks;

wherein a respective first single mesh line of the plurality of first single mesh lines is a unitary structure; and an entirety of the unitary structure crosses over only one second single mesh line of the respective one of the plurality of second mesh electrodes.

2. The display panel of claim 1, wherein a total number of the plurality of first single mesh lines is four, each of which is a unitary structure.

3. The display panel of claim 1, wherein two adjacent second mesh blocks of the plurality of second mesh blocks are electrically connected to each other through a respective second conductive bridge; and the respective second conductive bridge comprises a plurality of second single mesh lines spaced apart from each other, and in a same layer as the plurality of first mesh blocks and the plurality of second mesh blocks.

4. The display panel of claim 3, wherein a total number of the plurality of first single mesh lines is two.

5. The display panel of claim 3, wherein an extension direction of at least a segment of a respective first single mesh line of the plurality of first single mesh lines is the same as an extension direction of at least a segment of a respective second single mesh line of the plurality of second single mesh lines.

6. The display panel of claim 1, wherein the respective one of the plurality of first mesh electrodes further comprises a plurality of connecting mesh blocks in a same layer as the plurality of first mesh blocks and the plurality of second mesh blocks; and the two adjacent first mesh blocks of the plurality of first mesh blocks are electrically connected to each other through the respective first conductive bridge and a respective connecting mesh block of the plurality of connecting mesh blocks.

7. The display panel of claim 6, wherein the respective connecting mesh block is electrically connected to a first adjacent first mesh block of the two adjacent first mesh blocks through at least one first single mesh line of the plurality of first single mesh lines on a first side, and is electrically connected to a second adjacent first mesh block of the two adjacent first mesh blocks through at least one first single mesh line of the plurality of first single mesh lines on a second side.

8. The display panel of claim 7, wherein the at least one first single mesh line on the first side is spaced apart from the at least one first single mesh line on the second side by at least three subpixel regions.

9. The display panel of claim 6, wherein two adjacent second mesh blocks of the plurality of second mesh blocks and two second single mesh lines connecting the two adjacent second mesh blocks together surround the respective connecting mesh block.

10. The display panel of claim 9, wherein the two second single mesh lines surrounding the respective connecting mesh block are spaced apart from each other by five subpixel regions.

11. The display panel of claim 6, wherein the respective connecting mesh block has a pattern of mesh lines conforming to patterns of mesh lines of the plurality of first mesh blocks and the plurality of second mesh blocks.

12. The display panel of claim 6, wherein the respective connecting mesh block comprises at least three consecutive mesh ring structures and a plurality of branches extending away from the three consecutive mesh ring structures.

13. The display panel of claim 1, wherein a respective first single mesh line of the plurality of first single mesh lines is a curved line comprising a first segment and a second segment; and
the first segment and the second segment are along sides of no more than two subpixel regions.

14. The display panel of claim 1, wherein an orthographic projection of mesh lines of the plurality of first mesh blocks, the plurality of second mesh blocks, a plurality of connecting mesh blocks, the plurality of first single mesh lines, and a plurality of second single mesh lines has an approximate repeating pattern.

15. The display panel of claim 14, wherein a minimum repeating unit of the approximate repeating pattern encompasses four subpixel regions in a same pixel region.

16. The display panel of claim 14, wherein a minimum repeating unit of the approximate repeating pattern has a hexagonal shape;
the hexagonal shape comprises three consecutive ring structures;
the hexagonal shape comprises two sides extending along the second direction, two sides extending along a third direction, and two sides extending along a fourth direction;
each of the two sides extending along the second direction is along only one side of a subpixel region;
each of the two sides extending along the third direction are along two sides respectively from two subpixel regions; and
each of the two sides extending along the fourth direction are along two sides respectively from two subpixel regions.

17. A display apparatus, comprising the display panel of claim 1, and one or more integrated circuits connected to the display panel.

18. A display panel, comprising a touch control structure;
wherein the touch control structure comprises a plurality of first mesh electrodes and a plurality of second mesh electrodes;
wherein a respective one of the plurality of first mesh electrodes comprises a plurality of first mesh blocks consecutively electrically connected along a first direction;
a respective one of the plurality of second mesh electrodes comprises a plurality of second mesh blocks consecutively electrically connected along a second direction;
two adjacent first mesh blocks of the plurality of first mesh blocks are electrically connected to each other through a respective first conductive bridge; and
the respective first conductive bridge comprises a plurality of first single mesh lines spaced apart from each other, and in a layer different from the plurality of first mesh blocks and the plurality of second mesh blocks;
wherein two adjacent second mesh blocks of the plurality of second mesh blocks are electrically connected to each other through a respective second conductive bridge; and
the respective second conductive bridge comprises a plurality of second single mesh lines spaced apart from each other, and in a same layer as the plurality of first mesh blocks and the plurality of second mesh blocks;
wherein only portions of the respective one of the plurality of second mesh electrodes that crosses over the respective one of the plurality of first mesh electrodes are the plurality of second single mesh lines; and
a respective second single mesh line of the plurality of second single mesh lines crosses over only two single mesh lines of the plurality of first single mesh lines.

19. A display panel, comprising a touch control structure;
wherein the touch control structure comprises a plurality of first mesh electrodes and a plurality of second mesh electrodes;
wherein a respective one of the plurality of first mesh electrodes comprises a plurality of first mesh blocks consecutively electrically connected along a first direction;
a respective one of the plurality of second mesh electrodes comprises a plurality of second mesh blocks consecutively electrically connected along a second direction;
two adjacent first mesh blocks of the plurality of first mesh blocks are electrically connected to each other through a respective first conductive bridge; and
the respective first conductive bridge comprises a plurality of first single mesh lines spaced apart from each other, and in a layer different from the plurality of first mesh blocks and the plurality of second mesh blocks;
wherein two adjacent second mesh blocks of the plurality of second mesh blocks are electrically connected to each other through a respective second conductive bridge; and
the respective second conductive bridge comprises a plurality of second single mesh lines spaced apart from each other, and in a same layer as the plurality of first mesh blocks and the plurality of second mesh blocks;
wherein an extension direction of at least a segment of a respective first single mesh line of the plurality of first single mesh lines is the same as an extension direction of at least a segment of a respective second single mesh line of the plurality of second single mesh lines;
wherein an orthographic projection of the at least a segment of the respective first single mesh line on a base substrate substantially overlaps with an orthographic projection of the at least a segment of the respective second single mesh line on the base substrate.

* * * * *